US011122793B2

(12) United States Patent
Portuallo (10) Patent No.: US 11,122,793 B2
(45) Date of Patent: Sep. 21, 2021

(54) SYSTEMS AND METHODS FOR CONTROLLING IGUANA INFESTATION

(71) Applicant: Thomas Portuallo, Coral Springs, FL (US)

(72) Inventor: Thomas Portuallo, Coral Springs, FL (US)

(73) Assignee: Blue Iguana Pest Control, Inc., Coral Springs, FL (US)

(*) Notice: Subject to any disclaimer, the term of this patent is extended or adjusted under 35 U.S.C. 154(b) by 527 days.

(21) Appl. No.: 15/263,142

(22) Filed: Sep. 12, 2016

(65) Prior Publication Data

US 2018/0070579 A1 Mar. 15, 2018

(51) Int. Cl.
*A01M 29/30* (2011.01)

(52) U.S. Cl.
CPC .................................. *A01M 29/30* (2013.01)

(58) Field of Classification Search
CPC .............. A01M 29/30–34; A01G 9/28; A01G 13/0256; A01K 15/006; A01K 15/04; E04H 17/009; E04H 17/063
See application file for complete search history.

(56) References Cited

U.S. PATENT DOCUMENTS

| | | | | |
|---|---|---|---|---|
| 2,888,716 A * | 6/1959 | Kaufmann | ............ | A01M 29/32 52/101 |
| 2,915,879 A * | 12/1959 | Celestine | ............ | E02B 3/26 405/212 |
| 3,011,316 A * | 12/1961 | Wilson | ............ | E02B 3/06 405/28 |
| 3,342,033 A * | 9/1967 | Crouch | ............ | E02D 5/14 52/2.15 |
| 3,496,728 A * | 2/1970 | John | ............ | E02B 17/0004 405/211 |
| 4,300,306 A * | 11/1981 | Hudgin | ............ | A01M 1/223 174/117 M |
| 4,549,724 A * | 10/1985 | Taillandier | ............ | E01F 8/0041 256/12.5 |

(Continued)

FOREIGN PATENT DOCUMENTS

| | | | | |
|---|---|---|---|---|
| CA | 2836958 A1 * | 7/2015 | ............ | E06B 9/0692 |
| DE | 3627995 A1 * | 3/1988 | ............ | A01M 25/00 |

(Continued)

OTHER PUBLICATIONS

"Insect Mesh Netting," YouTube, Dec. 10, 2012, <https://www.youtube.com/watch?v=o9IHDSzeiHg> (Year: 2012).*

(Continued)

*Primary Examiner* — Magdalena Topolski
*Assistant Examiner* — Morgan T Barlow
(74) *Attorney, Agent, or Firm* — Nolan IP Law, PLLC; Jason M. Nolan (57) ABSTRACT

A system and method of controlling iguana infestation is provided. The system and method, being harmless to people and pets, can include a wall barrier, sea barrier, ground barrier, and climbing (tree, piling) barrier. The Iguana Sea Wall Barrier prevents iguanas from accessing property from the water. Iguana Piling Wraps can be included to prohibit access to the property via the dock. Iguana Tree Guards can be included to prevent iguanas from climbing up into trees.

11 Claims, 5 Drawing Sheets

(56) References Cited

U.S. PATENT DOCUMENTS

| | | | | |
|---|---|---|---|---|
| 4,582,300 A * | 4/1986 | Chappell | E04H 17/06 | 160/374 |
| 4,671,495 A * | 6/1987 | Garland | E01F 7/02 | 104/279 |
| 4,688,024 A * | 8/1987 | Gadde | F41H 11/05 | 256/1 |
| 4,738,563 A * | 4/1988 | Clark | E02B 5/08 | 405/52 |
| 4,815,235 A * | 3/1989 | Faltinowski | A01G 13/10 | 52/101 |
| 5,146,867 A * | 9/1992 | Goldschmidt | A01M 29/16 | 116/22 A |
| 5,195,460 A * | 3/1993 | Loken | A01K 39/0113 | 119/57.9 |
| 5,274,950 A * | 1/1994 | Roberts | A01M 1/245 | 43/121 |
| 5,417,017 A * | 5/1995 | Toutountzis | A01M 1/24 | 174/107 |
| 5,630,572 A * | 5/1997 | Guay | E04H 4/06 | 256/1 |
| 5,720,573 A * | 2/1998 | Benedict | E02B 3/04 | 256/12.5 |
| 5,807,024 A * | 9/1998 | Benedict | E02B 3/18 | 256/12.5 |
| 5,944,443 A * | 8/1999 | Benedict | E02B 3/04 | 256/12.5 |
| 6,182,412 B1 * | 2/2001 | Traxler | A01M 1/24 | 52/517 |
| 6,360,481 B1 * | 3/2002 | Nesic | A01G 13/10 | 239/53 |
| 6,481,926 B2 * | 11/2002 | Benedict | E02B 3/04 | 256/12.5 |
| 6,558,075 B2 * | 5/2003 | Benedict | E02B 3/04 | 256/12.5 |
| 7,140,599 B1 * | 11/2006 | Spink | B63G 9/04 | 256/13 |
| 9,326,458 B1 * | 5/2016 | Miller | A01G 13/105 | |
| 2002/0073633 A1 * | 6/2002 | Schlichting | A01M 29/32 | 52/101 |
| 2002/0139061 A1 * | 10/2002 | Roberts | A01M 29/34 | 52/101 |
| 2003/0024156 A1 * | 2/2003 | Tinshey | A01M 29/30 | 47/32.5 |
| 2004/0004210 A1 * | 1/2004 | Bauer | A01M 1/2011 | 256/32 |
| 2005/0184281 A1 * | 8/2005 | Bryan | A01G 13/10 | 256/25 |
| 2006/0101708 A1 * | 5/2006 | Cox | A01M 29/34 | 43/132.1 |
| 2008/0023128 A1 * | 1/2008 | Kaechle | A01M 29/30 | 156/217 |
| 2008/0282624 A1 * | 11/2008 | Francis | A01M 1/20 | 52/101 |
| 2009/0193752 A1 * | 8/2009 | Cox | A01M 1/24 | 52/741.3 |
| 2010/0059728 A1 * | 3/2010 | Bishop | E02B 3/06 | 256/24 |
| 2010/0199480 A1 * | 8/2010 | McGinn | A01G 13/105 | 29/428 |
| 2010/0224848 A1 * | 9/2010 | Singer | A01M 29/30 | 256/25 |
| 2010/0243979 A1 * | 9/2010 | Moore | E04H 17/18 | 256/19 |
| 2010/0263303 A1 * | 10/2010 | Kiserman | A01M 29/32 | 52/101 |
| 2012/0067295 A1 * | 3/2012 | Muckala | A01M 29/30 | 119/712 |
| 2015/0282471 A1 * | 10/2015 | Lampman | A01K 3/002 | 119/712 |
| 2015/0351330 A1 * | 12/2015 | Toye | A44B 13/0076 | 47/31 |
| 2016/0040820 A1 * | 2/2016 | Morris | F15D 1/04 | 138/39 |
| 2016/0097187 A1 * | 4/2016 | Johnston | E03F 7/06 | 137/544 |
| 2016/0165877 A1 * | 6/2016 | Sosa, Jr. | E04D 3/405 | 52/101 |
| 2016/0324080 A1 * | 11/2016 | Romero Araguete | A01K 47/06 | |
| 2017/0086393 A1 * | 3/2017 | Guigan | A01G 13/105 | |
| 2017/0354138 A1 * | 12/2017 | Romano | A01M 29/12 | |
| 2018/0010340 A1 * | 1/2018 | Linson | A01M 29/30 | |
| 2018/0153154 A1 * | 6/2018 | Cosgrover | A01K 75/00 | |

FOREIGN PATENT DOCUMENTS

| | | | | |
|---|---|---|---|---|
| DE | 9317099 U1 * | 1/1994 | | A01M 29/30 |
| DE | 29601922 U1 * | 4/1996 | | A01M 29/30 |
| DE | 202011003257 U1 * | 9/2011 | | A01M 21/00 |
| DE | 202014004035 U1 * | 5/2014 | | A01M 29/30 |
| DE | 102013014970 A1 * | 3/2015 | | A01M 29/30 |
| FR | 2586386 A1 * | 2/1987 | | B60R 16/0215 |
| FR | 3062025 A1 * | 1/2017 | | A01M 29/30 |
| FR | 3050221 A1 * | 10/2017 | | E04H 17/22 |
| WO | WO-2014182180 A1 * | 11/2014 | | A01G 13/02 |

OTHER PUBLICATIONS

"Easy Poor Man's Dog or Fox Proof Fencing for Chicken Pen," YouTube, Aug. 10, 2013, <https://www.youtube.com/watch?v=vlmDf-wTXzc> (Year: 2013).*

"Iguana Control Services," Aug. 1, 2015 (Year: 2015).*

"7 Ways To Protect Your Chickens From Weasels," Country Pests, Jun. 1, 2019 (Year: 2019).*

* cited by examiner

SYSTEMS AND METHODS FOR CONTROLLING IGUANA INFESTATION

BACKGROUND OF THE INVENTION

1. Field of the Invention

Embodiments of the present invention generally relate to pests, and more particularly to iguanas.

2. Description of the Related Art

Iguanas are herbivorous lizards with exceptional vision native to tropical areas of Mexico, Central America, and the Caribbean. They range in size between five (5) and six (6) feet long. Most people are familiar with the common green iguana. These pests are non-native to North America and the infestation of iguanas in the United States have caused havoc for residents and native species.

South and Central Florida's subtropical climate allows these large herbivorous (plant-eating) lizards to survive, reproduce, and become part of the Florida environment. Three large members of the iguana family (Iguanidae) have become established in south Florida.

Adult iguanas are herbivores feeding on foliage, flowers, and fruit. They will occasionally eat animal material such as insects, lizards, and other small animals, nestling birds and eggs. Juveniles eat more animal material, especially insects, and hatchling green iguanas eat the droppings of adult iguanas to acquire the gut bacteria that help them digest plant material. Males are territorial against other males, but are not territorial against females and juveniles. These large lizards like to bask in open areas, sidewalks, docks, seawalls, landscape timbers, or open mowed areas. If frightened, they dive into water (green iguanas and basilisks) or retreat into their burrows (spiny tailed iguanas). This habit of diving into the water to escape makes green iguanas very difficult to capture. Basilisks and anoles generally eat insects and small vertebrate prey, but Knight anoles occasionally eat small fruits and flowers as well.

Damage caused by iguanas includes eating valuable landscape plants, shrubs, and trees, eating orchids and many other flowers, eating dooryard fruit like berries, figs, mangos, tomatoes, bananas, lychees, etc. Iguanas do not eat citrus. Burrows that they dig undermine sidewalks, seawalls, and foundations. Burrows of iguanas next to seawalls allow erosion and eventual collapse of those seawalls. Droppings of iguanas litter areas where they bask. This is unsightly, causes odor complaints, and is a possible source of salmonella bacteria, a common cause of food poisoning. Adult iguanas are large powerful animals that can bite, cause severe scratch wounds with their extremely sharp claws, and deliver a painful slap with their powerful tail. Iguanas normally avoid people but will defend themselves against pets and people that try to catch them or corner them.

Additionally, they defecate in common public areas such as pools, parks, playgrounds, and docks, causing health risks as their feces carry salmonella. Moreover, the burrows they dig (up to 9 feet) undermine sidewalks, seawalls, and foundations causing structural damage. As vegetarians, the four-footed reptiles eat their way through landscaping. They sunbathe during the day and cozy up in treetops by night. They can lay as many as three dozen eggs in a single burrow. Although iguanas are docile, there are many reported incidents where they have harmed pets and individuals. As with any species, they are territorial, the more dominant males will push the less dominant males to surrounding areas, which leads to infestation.

If you simply remove an iguana from a facility, another will come to take its place. Instead, an effective solution is to create an environment so the iguana decides against nesting on your property. Hence, there is a long pending need to have a system and method of controlling iguanas.

SUMMARY

In accordance with one embodiment, the comprehensive systems and methods assists in creating an environment of controlling iguana infestation at the same time being harmless to people and pets. The Iguana Barrier creates a temporary wall (used on initial treatment of infested property). The Iguana Sea Wall Barrier prevents them from accessing property from the water. Our Iguana Piling Wraps prohibit access via the dock. The Iguana Tree Guards prevent iguanas from climbing up into trees. Our products and services have been proven to remove iguana from infested areas.

BRIEF DESCRIPTION OF THE DRAWINGS

The drawings, in which like numerals represent similar parts, illustrate generally, by way of example, but not by way of limitation, various embodiments discussed in the present document.

DETAILED DESCRIPTION

The foregoing summary, as well as the following detailed description of certain embodiments of the subject matter set forth herein, will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In the following detailed description, reference is made to the accompanying drawings which form a part hereof, and in which are shown by way of illustration specific embodiments in which the subject matter disclosed herein may be practiced. These embodiments, which are also referred to herein as "examples," be described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by the appended claims and their equivalents. In the description that follows, like numerals or reference designators will be used to refer to like parts or elements throughout. In this document, the terms "a" or "an" are used, as is common in patent documents, to include one or more than one. In this document, the term "or" is used to refer to a nonexclusive or, unless otherwise indicated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
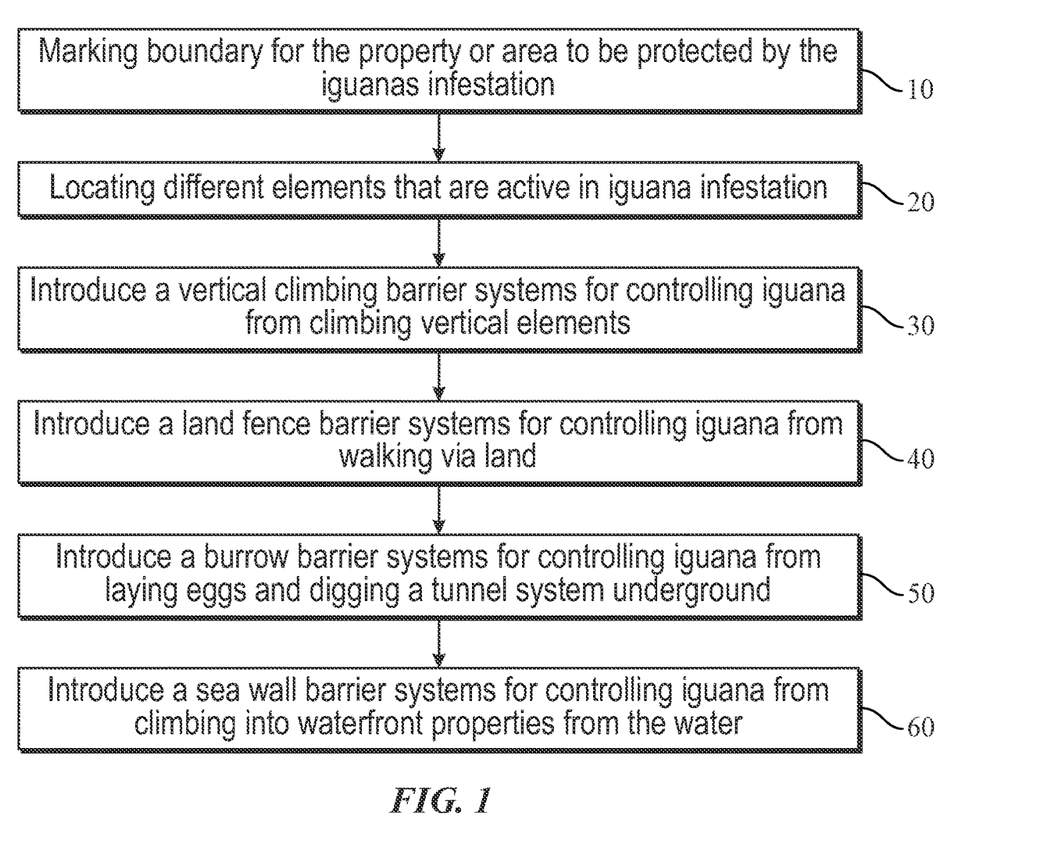
FIG. 1 illustrates a method for controlling iguana infestation in accordance with an embodiment.

FIG. 1 illustrates a method for controlling iguana infestation in accordance with an embodiment. As iguanas are creatures of habit, when simply removed the iguana from a property, another will come to take its place. Instead, an effective solution is to create an environment so the iguana decides not to nest on your property. The method provided creates a holistic environment to prevent iguana's infestation, while being harmless to occupants of the property including humans and pets.

The steps of FIG. 1 start with step 10, which comprises marking a boundary (PA) for the property or area that is to be protected from the iguana infestation. The boundary PA for the protected property is real property as indicated with the broken line in FIG. 4. Next, the process includes step 20, which comprises locating the different elements that are active in iguana infestation. The different elements that may contribute to the iguana infestation are the land based access or sea/water based access to the land. In some instances, the iguanas climb a vertical structure close to the land and contaminate the land via fecal matter or gain access to such land by jumping inside the boundaries via elevated platforms.

Figure 2:
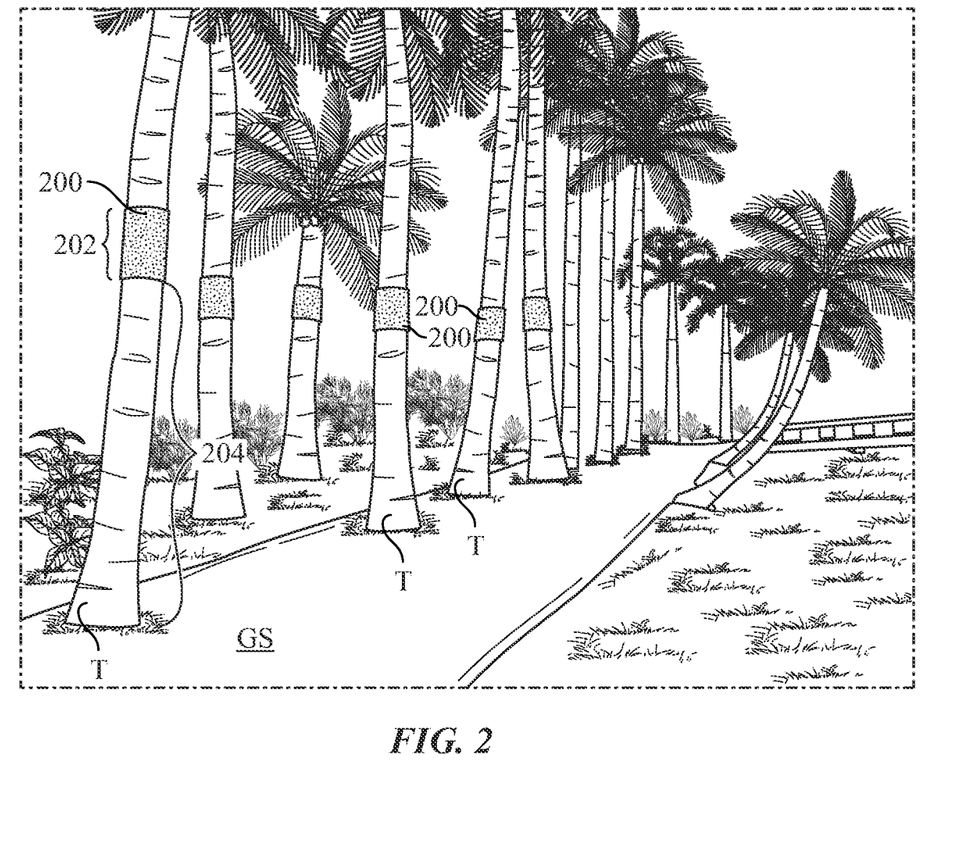
FIG. 2 illustrates an element, a tree wrap, of a system for controlling iguana infestation in accordance with an embodiment.
Figure 3:
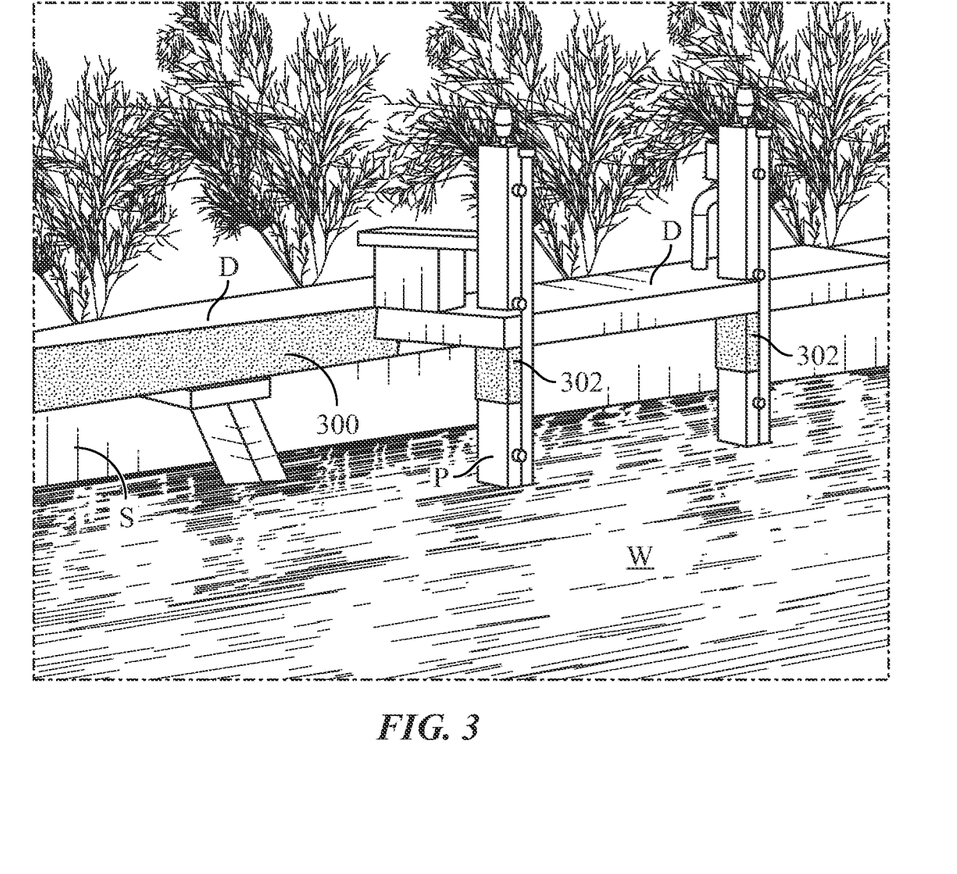
FIG. 3 illustrates another element, a piling wrap and end cap, of a system for controlling iguana infestation in accordance with an embodiment.

Step 30 comprises introducing vertical climbing barrier systems for controlling iguana from climbing vertical elements. FIG. 2 illustrates an element, a tree wrap 200, of a system for controlling iguana infestation in accordance with an embodiment. FIG. 3 illustrates another element, a piling wrap 302, of a system for controlling iguana infestation in accordance with an embodiment. The method step 30, involving the climbing barrier, includes attaching one or more wraps 200, 302 to the vertical structures. The wraps 200, 302 form a continuous wrap or sleeve around the climbing structure covering a span (e.g., 202) of the vertical structure. These vertical structures may include dock pilings (P), trees (T), electric poles, or the like, or any combination thereof.

It may be possible that when this vertical barrier system is attached to a tree or piling or the like, that the uneven surface of the tree provides a space between the vertical barrier (e.g., wrap) and the body of the vertical structure. This space may be large enough in some instances to allow iguanas to crawl between the vertical barrier and the vertical structure. Such space may leave a wrap ineffective in preventing the iguanas from gaining access to the top of such vertical structures. The method described in the subject matter herein provides for a step to overcome these spaces.

The space formed between the vertical barrier and the vertical structure due to the uneven surface of the vertical structure may be protected by placing a mesh in the space and filing the space with foam. For example, the mesh is formed into a basket the size of the space and placed inside the space to prevent an iguana from crawling between the barrier and the wrap. For additional protection, the space is filled with spray foam thereby removing all access to the space for iguanas. Spray foam is a chemical product of materials that bubble and expand up to 280 times its liquid volume after it is sprayed in place. This expansion makes it useful as a specialty packing material, which forms to the shape of the product being packaged and produces a high thermal insulating value with virtually no air infiltration.

The vertical barrier wrap 200 may be made of a high-density polyethylene (HDPE) or polyethylene high-density (PEHD). Additionally, the wrap may be UV treated. In some embodiments, for example, the size 202 of the wrap for the vertical barrier may be thirty by thirty inches in size. A roll of the wrap may be up to 350 feet in length. The color of the wrap may be a close match to the color of the vertical structure. The steps involved in selecting the wrap may involve measuring the circumference of vertical structure at a point where the wrap is to be installed. For example, the point of interest for installing the wrap may be where the angle of the vertical structure is greater than forty five (45) degrees or more, or above other foliage which would allow iguana to climb past the barrier. For aesthetic purpose the wrap may be installed at a same height 204 for all vertical structures, as shown in FIG. 2. If multiple wraps are used, they are overlap by at least 3 inches making a straight line edges.

In another example, the vertical barrier wrap may be used for a dock piling barrier. Similar to the previous method, a user can measure the circumference of the dock piling P just below support beams. As long as the high tide does not allow water to touch the piling wrap 302. If high tide causes water to reach the piling wrap, then the piling wrap can be raised to cover supports and trim accordingly. If multiple wraps are used, they can overlap by 3" making a straight line edges or trim excess. One example for fastening the piling wrap to the piling P may be to use a drill to create hole in wrap and piling and insert tabs.

Figure 4:
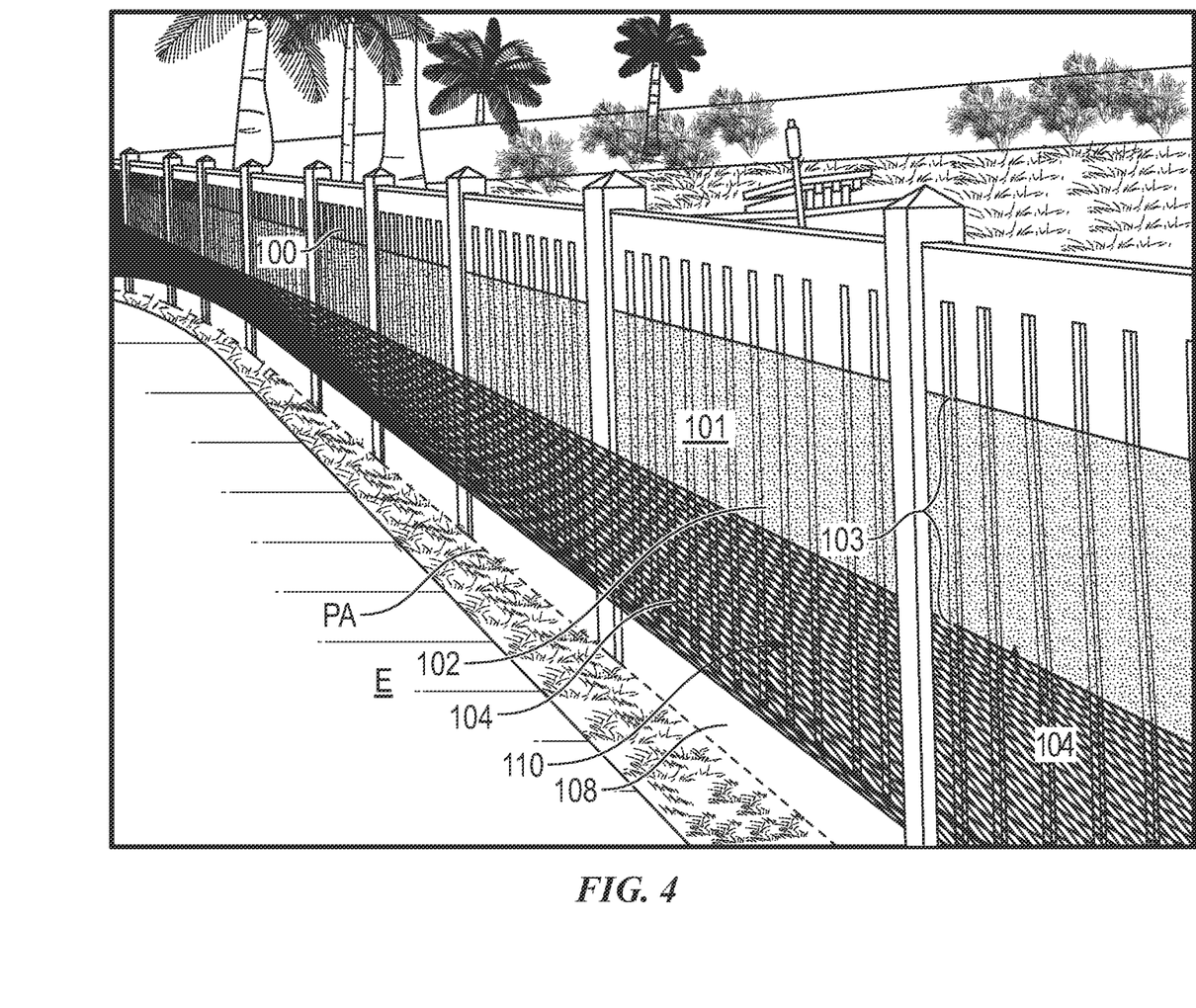
FIG. 4 illustrates another element, a fence barrier, of a system for controlling iguana infestation in accordance with an embodiment.

Step 40 comprises introducing a land fence barrier system for controlling iguana from walking via land. FIG. 4 illustrates a mesh fence barrier 104, of a system for controlling iguana infestation in accordance with an embodiment, between the horizontal rail 108 and the fence wrap 102. The method may further include configuring an iguana specific fence wrap 102. This fence wrap 102 will prevent iguana from climbing up and over the fence thus restrict the iguanas from crawling over land to gain access to the land being protected.

The fence wrap 102 comprises one or more horizontally spanning fence wraps attached to at least the fence's outer face 101 at a certain height above the ground with a matt side of the plate 101 forming the unattached side. In an optional embodiment of the subject matter described herein, the fence wrap 102 is placed both outside/exterior (E) and inside the fence.

The fence wrap 102 forms a continuous band around the entire perimeter of the fence 100. In some embodiments, the fence wrap 102 is at least half the average toe to toe length of iguana. For example, the fence wrap 102 is at least three inches high. In some embodiments, the fence 100 is a Picket Fencing with the spacing 110 between vertical boards being at least two inch or less. Additionally, the height at which the fence wraps are placed is at least one and a half feet above the ground surface (GS).

Figure 5:
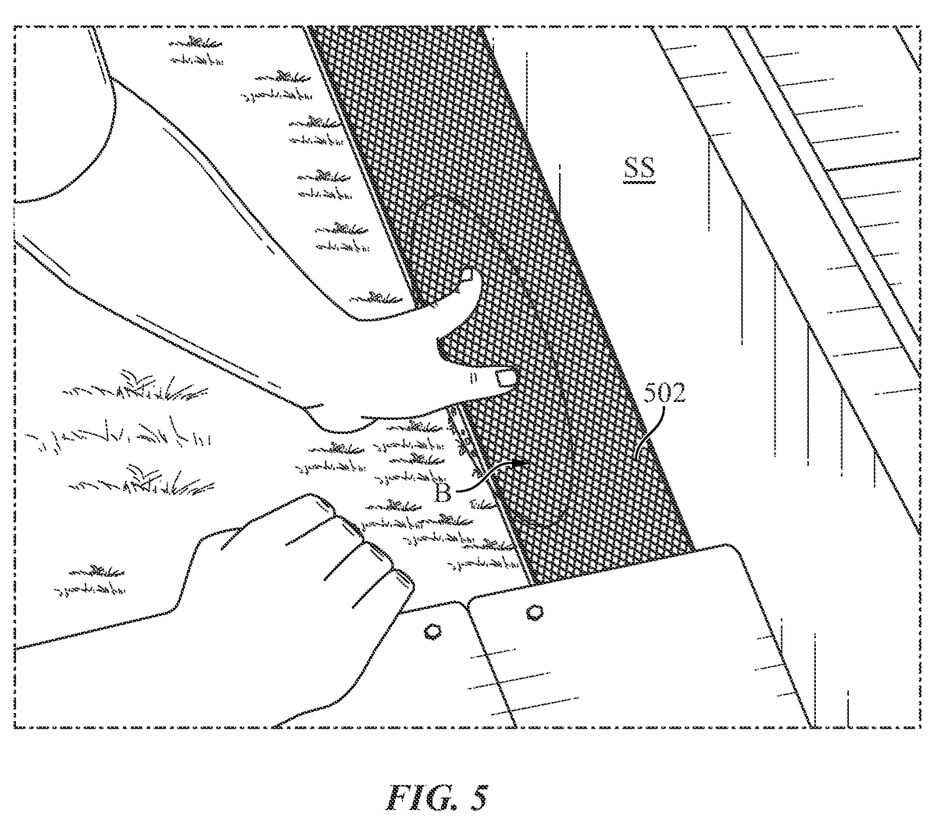
FIG. 5 illustrates another element, a wire-mesh deck barrier, of a system for controlling iguana infestation in accordance with an embodiment.

Step 50 comprises introducing a burrow barrier systems for controlling iguana from laying eggs and digging a tunnel system underground a surface structure (SS). FIG. 5 illustrates another element, a wire-mesh deck barrier 502, of a system for controlling iguana infestation in accordance with an embodiment. The subsurface barrier under the surface structure SS comprises creating an anti-hole barrier. Creating the anti-hole barrier includes locating the hole/burrow B, widening the area to a two feet by two feet area with the hole in the center of the widened area, collapsing the hole, and placing a two feet by two feet piece of mesh 502, covering the area with dirt. For example, the mesh is a half inch squares, galvanized metal nineteen gauge, welded, metal mesh.

For the anti-hole barrier, dig around the hole B being careful to keep hole intact. Dig down approximately 1 foot and widen area to two feet by two feet area with the hole in the center. Cut mesh piece to fit the area (2'×2'). For example, the mesh maybe ½" squares, 36" tall, galvanized metal mesh with a nineteen gauge, welded metal. Collapse hole and cover with mesh 502. Cover entire area with dirt and monitor following week for any activity.

Optionally, the burrow barrier may be a water wall barrier comprising preventing seawall access by iguanas by placing a wrap over a hole in the sea wall. Then securing the wrap to hold in place such that the wrap prevents iguanas from digging holes further and also from climbing the walls. For example, the wrap is a cut of size eight inch by fifteen inches. This may be a best case where allowed but not less than twelve inches high.

In one example, the wrap may be attached to the wall using a rivet. The user may use a hammer drill to make half inch (½") deep hole with about quarter inch (¼") diameter for inserting a rivet. Place wrap over hole and use punch to make hole in wrap. Next step may involve placing the wrap over the hole in sea wall and punching rivet to hold wrap in place. These rivets may be place both at the top edge and bottom edge of the wrap. Further example may involve placing the rivet every 8" along top of wrap (which is placed within ½" of top f sea wall on water side of seawall) and place rivet every 16" on bottom within ½" from bottom edge. Place all rivets so they are in equal spaces from each other and offers uniformed appearance. Continue placing the wrap until you reach the end of seawall.

Step 60 comprises introducing a sea wall barrier system for preventing an iguana from climbing into waterfront properties (e.g., deck D in FIG. 3) from the water W. The water barrier comprises an end cap 300 created for an overhanging seawall S prevents iguanas from climbing up or across the sea wall. The end cap 300 is a smooth acute angled cap on the edge of the wall wherein the cap projects out at an acute angle to the sea wall's vertical surface.

The end cap 300 may measure from six inch (6") over hanging sea wall S to fence/wall barrier/etc. on property. The process of preparing a sea wall may involve measuring down four inch (4") from edge of overhanging sea wall, measure back from this point to sea wall face. Cut a PVC sticks to fit and assemble "square" with tab overhanging seawall. Assemble with angel and flat braces. Attach mesh to one side. Take 12" strips and cover top and side edge overhanging seawall with zips. Anchor into seawall with screws and brackets. PVC should previously be painted the color of wrap being used.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions, types of materials and coatings described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for protecting an area of real property from an iguana, the method comprising:
   installing a land barrier to a fence positioned at a perimeter of the area of real property to be protected to prevent the iguana from walking into the area, the land barrier comprising a plurality of mesh fence barriers and a plurality of fence wraps,
   wherein each mesh fence barrier extends from a horizontal rail of the fence positioned near a ground surface to each respective fence wrap, and
   wherein at least one of the plurality of fence wraps is attached to an external face of the fence, each fence wrap on the external face of the fence includes a substantially flat first surface in contact with the external face of the fence;

installing a subsurface barrier around a hole or burrow at the perimeter of the area to be protected to prevent the iguana from entering the area, the subsurface barrier comprising a piece of mesh,
wherein the installing the subsurface barrier comprises a step of widening an area around the hole or burrow, a step of collapsing the hole with dirt, and a step of positioning the piece of mesh over the collapsed hole;

installing at least one water barrier to prevent the iguana from crawling into the area to be protected from a body of water adjacent to the perimeter of the area, the at least one water barrier comprising a piling wrap secured around a piling in the body of water such that the piling wrap is above the body of water; and installing a climbing barrier to prevent the iguana from climbing up a tree and entering the area to be protected from above, wherein the climbing barrier comprises at least one tree wrap coupled to at least one tree;

wherein each fence wrap, each piling wrap, and each tree wrap consists of one of high-density polyethylene (HDPE) or polyethylene high-density (PEHD), and each fence wrap, each piling wrap, and each tree wrap is installed such that a smooth surface is exposed, preventing the iguana from climbing past the respective wrap.

2. The method of claim 1, wherein each fence wrap is positioned at a spaced distance from ground surface, and each fence wrap includes a substantially flat second surface opposite the flat first surface, the second surface consisting of the smooth surface.

3. The method of claim 2, wherein each fence wrap is sized with a height of at least three inches.

4. The method of claim 2, wherein the fence comprises a plurality of evenly spaced vertical boards attached to the horizontal rail near the ground surface.

5. The method of claim 2, wherein each fence wrap is positioned at least one and a half feet above the ground surface.

6. The method of claim 2, wherein the plurality of fence wraps further comprises at least one fence wrap positioned on an internal-facing surface of the fence, the internal-facing surface being the surface facing the area to be protected.

7. The method of claim 1, wherein the installing the subsurface barrier further comprises a step of covering the mesh with dirt.

8. The method of claim 1, wherein each mesh fence barrier comprises a galvanized metal.

9. The method of claim 1, wherein the water barrier further includes an end cap attached to a vertical surface of an overhanging seawall, the end cap configured to prevent the iguana from climbing up or across the seawall.

10. The method of claim 9, wherein the end cap comprises one of high-density polyethylene (HDPE) or polyethylene high-density (PEHD) forming a smooth surface that projects at an acute angle relative to the vertical surface of the seawall.

11. The method of claim 1, wherein the installing the climbing barrier further comprising filling a space between each tree wrap and a surface of the tree with spray foam.

* * * * *